Figure 1:
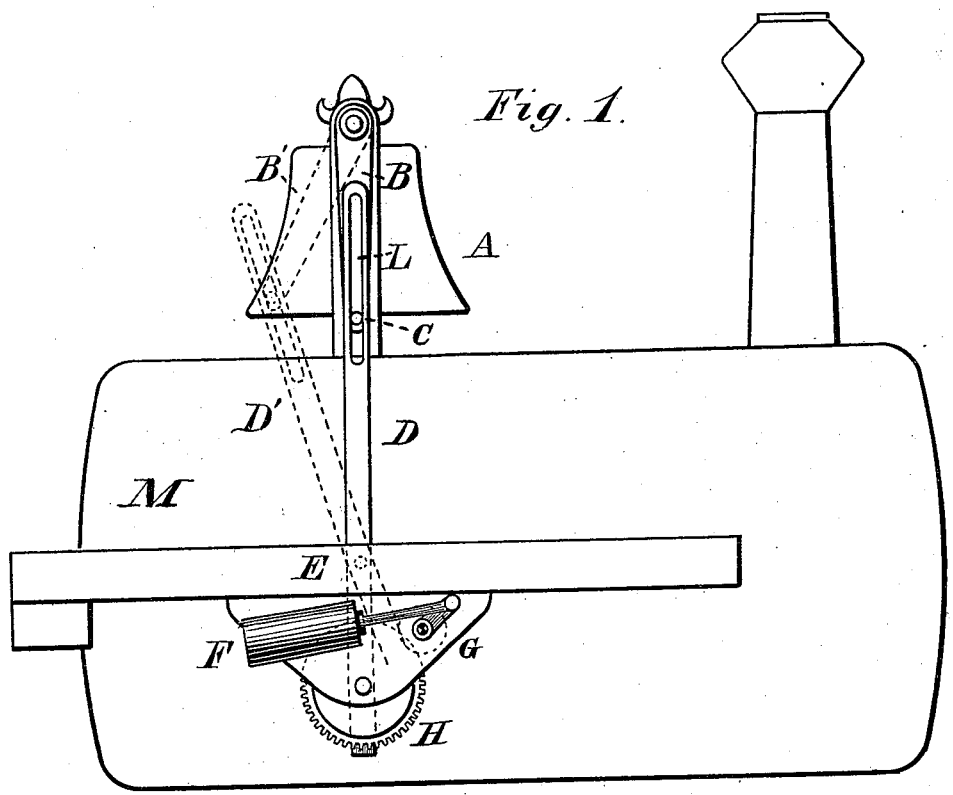
Figure 2:
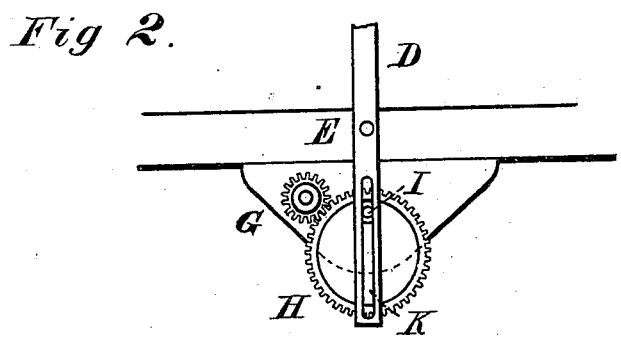

W. C. OVENDEN.
Bell-Ringer for Locomotives.

No. 200,330.  Patented Feb. 12, 1878.

WITNESSES:  
Edward K. Hill.  
Jas. Greene.

INVENTOR:  
W. C. Ovenden.  
BY HIS ATTY., James G. Arnold

N. PETERS, PHOTO-LITHOGRAPHER, WASHINGTON, D. C.

UNITED STATES PATENT OFFICE.

WILLIAM C. OVENDEN, OF WORCESTER, MASSACHUSETTS.

IMPROVEMENT IN BELL-RINGERS FOR LOCOMOTIVES.

Specification forming part of Letters Patent No. 200,330, dated February 12, 1878; application filed August 27, 1877.

*To all whom it may concern:*

Be it known that I, WILLIAM C. OVENDEN, of the city and county of Worcester, State of Massachusetts, have invented a new Bell-Ringer for Locomotives, and other steam-boilers, of which the following is a specification:

My invention is applicable to the steam-boilers of locomotives and other machines or places where it is desirable to ring a bell.

Its nature consists in attaching a small oscillating or other auxiliary cylinder with gearing or other suitable mechanism, and connecting the same to the bell, so that by simply turning on the steam it shall ring the bell, and continue to do so until shut off.

In the accompanying drawings my invention is represented as attached to a locomotive.

M is the steam-boiler; F, the oscillating cylinder; G H, the gearing; I, the crank or pin driving the slotted lever D, which is pivoted at E, and by its slot gives motion to the bell-arm B and bell A. The slot in the lever D, receiving its motion from the crank I, will necessarily have an unequal motion, and consequently move the bell slowly one way and faster the other, thus preventing the possibility of the bell and its clapper swinging regularly together without hitting each other, but will make them strike one or more times every turn of the crank; and by the use of a little judgment they can be so connected that the bell, when at rest, shall hold the cylinder off its centers, ready to start by simply letting on the steam.

I claim—

The combination of the engine F, the crank I, slotted lever D, and the bell-arm B, as and for the purposes described.

WILLIAM C. OVENDEN.

Witnesses:
JAMES G. ARNOLD,
JAS. GREENE.